(12) United States Patent
Licht et al.

(10) Patent No.: US 11,916,359 B2
(45) Date of Patent: Feb. 27, 2024

(54) MOUNTING RAIL ADAPTER AND SET CONSISTING OF MOUNTING RAIL ADAPTER AND ELECTRICAL ASSEMBLY

(71) Applicant: WAGO Verwaltungsgesellschaft mbH, Minden (DE)

(72) Inventors: Cord-Henrik Licht, Rintein (DE); Rudolf Mastel, Minden (DE); Florian Schenk, Loehne (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 278 days.

(21) Appl. No.: 17/152,332

(22) Filed: Jan. 19, 2021

(65) Prior Publication Data
US 2021/0226423 A1 Jul. 22, 2021

(30) Foreign Application Priority Data
Jan. 17, 2020 (DE) ...................... 20 2020 100 240.6

(51) Int. Cl.
*H01R 9/26* (2006.01)
*H02B 1/052* (2006.01)
*H02B 1/048* (2006.01)

(52) U.S. Cl.
CPC ........... *H02B 1/052* (2013.01); *H01R 9/2608* (2013.01); *H02B 1/048* (2013.01)

(58) Field of Classification Search
None
See application file for complete search history.

(56) References Cited

U.S. PATENT DOCUMENTS

| | | | |
|---|---|---|---|
| 6,172,877 B1 | 1/2001 | Feye-Hohmann et al. | |
| 9,357,661 B2 * | 5/2016 | Soefker | H05K 7/142 |
| 9,454,140 B2 | 9/2016 | Godau et al. | |

FOREIGN PATENT DOCUMENTS

| | | |
|---|---|---|
| DE | 29500255 U1 | 3/1995 |
| DE | 29713960 U1 | 12/1997 |
| DE | 19918842 A1 | 10/2000 |
| DE | 102011110182 A1 | 2/2013 |
| DE | 202014105219 U1 | 6/2015 |

* cited by examiner

*Primary Examiner* — Felix O Figueroa
(74) *Attorney, Agent, or Firm* — Muncy, Geissler, Olds & Lowe, P.C.

(57) ABSTRACT

A mounting rail adapter for fastening at least one electrical assembly to a mounting rail. The mounting rail adapter has mounting rail fastening elements that fasten the mounting rail adapter to the mounting rail and an assembly fastening region that is configured to fasten the at least one electrical assembly. In the assembly fastening region, at least one assembly fastening element is provided, at which the electrical assembly can be fastened to the mounting rail adapter. The at least one assembly fastening element forms a pivot bearing element to form a pivot joint between the electrical assembly and the mounting rail adapter.

12 Claims, 5 Drawing Sheets

MOUNTING RAIL ADAPTER AND SET CONSISTING OF MOUNTING RAIL ADAPTER AND ELECTRICAL ASSEMBLY

This nonprovisional application claims priority under 35 U.S.C. § 119(a) to German Patent Application No. DE 20 2020 100 240.6, which was filed in Germany on Jan. 17, 2020, and which is herein incorporated by reference.

BACKGROUND OF THE INVENTION

Field of the Invention

The present invention relates to a mounting rail adapter for fastening at least one electrical assembly to a mounting rail, wherein the mounting rail adapter has mounting rail fastening elements that are configured to fasten the mounting rail adapter to the mounting rail, wherein the mounting rail adapter has an assembly fastening region that is configured to fasten the at least one electrical assembly, wherein the mounting rail adapter has, in the assembly fastening region, at least one assembly fastening element, at which the electrical assembly can be fastened to the mounting rail adapter. The invention additionally relates to a set consisting of such a mounting rail adapter and at least one electrical assembly that can be fastened or is fastened to the mounting rail adapter.

Description of the Background Art

Mounting rails are used in the field of electrical installation for the fastening of electrical assemblies, for example for fastening terminal strips, electronic devices, and other electronic equipment. If the electronic assembly that is to be fastened to the mounting rail does not have its own mounting rail fastening elements, a mounting rail adapter of the above-described type can be utilized. With such a mounting rail adapter, the electrical assembly can then be fastened to the mounting rail by the mounting rail fastening elements of the mounting rail adapter.

SUMMARY OF THE INVENTION

It is therefore an object of the present invention to provide a mounting rail adapter with improved functionality. It is a further object to specify an advantageous set consisting of such a mounting rail adapter and an electrical assembly.

This object is attained in a mounting rail adapter of the abovementioned type by the means that the assembly fastening element forms a pivot bearing element to form a pivot joint between the electrical assembly and the mounting rail adapter. Due to the pivot bearing element, the electrical assembly can be pivotably fastened to the mounting rail adapter, or in other words a pivoting motion of the electrical assembly can be carried out on the mounting rail adapter. As a result, both installation of the electrical assembly on the mounting rail adapter and removal of the electrical assembly from the mounting rail adapter are simplified in many situations and made more pleasant for the user. Moreover, certain additional tasks and operations on the electrical assembly can be simplified by the pivotability of the electrical assembly on the mounting rail adapter, as for example putting a mating connector onto a plug-and-socket connector of the electrical assembly.

The electrical assembly accordingly can be fastened to the mounting rail adapter in such a manner that it first is placed on the mounting rail adapter at an angle to the plane of the mounting rail and is pivoted in toward the plane of the mounting rail with a subsequent pivoting motion about a pivot axis formed by the fastening elements.

Fundamentally any desired mounting rail can be used as the mounting rail here, with it being necessary for the mounting rail fastening elements to be matched to the shape of the mounting rail. The mounting rail can be designed as a top-hat rail, for example. In cross section, such a top-hat rail has a U-shape with two mounting rail edges projecting laterally in opposite directions. The mounting rail fastening elements can have at least one latching element, by which means the mounting rail adapter can be snapped onto the mounting rail.

The electrical assembly can, for example, be designed as a plug-and-socket connector or have such a plug-and-socket connector. The electrical assembly can also be, for example, a conductor connection terminal, for instance in the form of a socket connector. Because of the pivot joint designed as described above, the electrical assembly can be placed on the mounting rail adapter at an angle to the plane of the mounting rail and be pivoted in toward the plane of the mounting rail with a subsequent pivoting motion about an axis defined by the assembly fastening element. For this purpose one or more receiving elements, which are designed as a counterpart to the assembly fastening elements of the mounting rail adapter, are advantageously present on the electrical assembly.

The mounting rail adapter can have a body, wherein at least one assembly fastening element is designed as a first retaining pin projecting from the body in the assembly fastening region. In particular, the assembly fastening element forming a pivot bearing element can be designed as such a retaining pin. Advantageously, the electrical assembly then has a retaining pin receptacle for receiving the first retaining pin.

The first retaining pin can project from the body in a projection direction, wherein the first retaining pin is designed to be angled in cross-sectional profile in a section plane extending in the projection direction. Due to the angled design of the first retaining pin, an interlocking connection can be created with the corresponding retaining pin receptacle on the electrical assembly. Together with the corresponding receptacle on the electrical assembly, the assembly fastening element then forms an inseparable interlocking engagement acting perpendicularly to the plane of the mounting rail, at least in a specific pivot position or in a pivot range. The angling preferably is designed to be one-sided, resulting in an L-shape in cross section. Alternatively, the angling can also be provided on both sides of the retaining pin, resulting in a T-shape in cross section.

An additional assembly fastening element can be designed as a second retaining pin that projects from the body in the assembly fastening region and is arranged next to the first retaining pin. By means of such a second retaining pin, which is present in addition to the first retaining pin, fastening of the electrical assembly to the mounting rail fastening adapter can be further improved.

The second retaining pin can project from the body in a projection direction, wherein the second retaining pin is designed to be angled in cross-sectional profile in a section plane extending in the projection direction. By this means, the inseparable, interlocking connection of the electrical assembly to the mounting rail fastening adapter perpendicular to the plane of the mounting rail is further improved.

Respective angled sections of the first and second retaining pins can be angled in directions that point away from one another. This permits especially reliable fastening of the electrical assembly to the mounting rail adapter, even in the event of relatively high forces acting on the electrical assembly. Alternatively, it is also possible, however, for the angled sections of the first and second retaining pins to point in a common direction. In addition, the second retaining pin can have a section that is angled on both sides, so that the second retaining pin can also form a T-shape in cross section.

The angled section of the second retaining pin can be designed to be shorter than the angled section of the first retaining pin. The inward pivoting of the electrical assembly into the plane of the mounting rail or, in the reverse operation, the outward pivoting from the plane of the mounting rail is simplified by this means.

The mounting rail adapter can have at least one snap-in arm that is arranged in the assembly fastening region or next to the assembly fastening region and that projects from the body, at which arm the electrical assembly or an assembly coupled thereto can be secured on the mounting rail adapter in at least a first pivot position. By means of such a snap-in arm, the electrical assembly or an assembly coupled thereto can be secured in the first pivot position, in particular in a non-pivoting manner. It is ensured in this way that the electrical assembly or the assembly coupled thereto does not alter a desired positioning even in the event of externally acting forces. The securing by means of the snap-in arm can be a releasable securing. To release the securing, the snap-in arm can be deflected in a direction pointing away from the electrical assembly, for example.

The mounting rail adapter can have at least one additional latching element, at which the electrical assembly or an assembly coupled thereto can be secured on the mounting rail adapter in at least a second pivot position that differs from the first pivot position. The electrical assembly can be secured in the second pivot position in a non-pivoting manner by the additional latching element. In this way, two stable pivot positions can be taken on by the electrical assembly or the assembly coupled thereto. For example, the first pivot position can be an operating position in which the electrical assembly performs its intended function. The second pivot position can be an installation position in which the electrical assembly is installed on the mounting rail adapter or other installation tasks are performed on the electrical assembly, for example the attachment of a mating connector or the removal of the mating connector from the electrical assembly.

The mounting rail adapter can have at least one locking element by means of which an additional assembly connected to the electrical assembly that is fastened to the mounting rail adapter is locked in at least one pivot position on the mounting rail adapter in at least one spatial direction of the assemblies. This is especially advantageous when the electrical assembly is a plug-and-socket connector and the additional assembly is a mating connector associated as a counterpart that is mated with the plug-and-socket connector. The plug-and-socket connection can accordingly be safeguarded by means of the locking element. The at least one spatial direction of the assemblies can be, e.g., a direction in which the assemblies can be separated from one another (separation direction of the assemblies). In the case of an electrical plug-and-socket connection, this can be the plug-in direction in which the plug-and-socket connector can be mated with the mating connector or released again in the opposite direction.

In this way, an integrated locking of the mounting rail adapter is realized, by means of which the additional assembly can be secured on the mounting rail adapter in the pivoted-in position (first pivot position) by interlocking elements.

The mounting rail adapter can have at least one guide element in the assembly fastening region, by which means the electrical assembly is guided during the pivoting motion carried out on the assembly fastening element. The electrical assembly can be guided by means of the guide element, in particular in the end region of the pivoting motion when the electrical assembly is already nearly parallel to the plane of the mounting rail. By this means, handling of the mounting rail adapter is further improved for the user.

The mounting rail adapter can be designed in at least two parts with a first and a second adapter part, and the electrical assembly can be fastened to the first adapter part on one side and to the second adapter part on another side. By this means, the material requirement for the material needed for the mounting rail adapter, for example a plastic material, is minimized. Moreover, due to the two-part implementation, the mounting rail adapter is suitable for fastening electrical assemblies of different widths to a mounting rail.

The first and/or the second adapter part each can have one, several, or all features of the mounting rail adapter of the type described above.

The above-mentioned object is additionally attained by a set consisting of a mounting rail adapter of the type described above and at least one electrical assembly that can be fastened or is fastened to the mounting rail adapter. The advantages described above can be realized by this means, as well.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
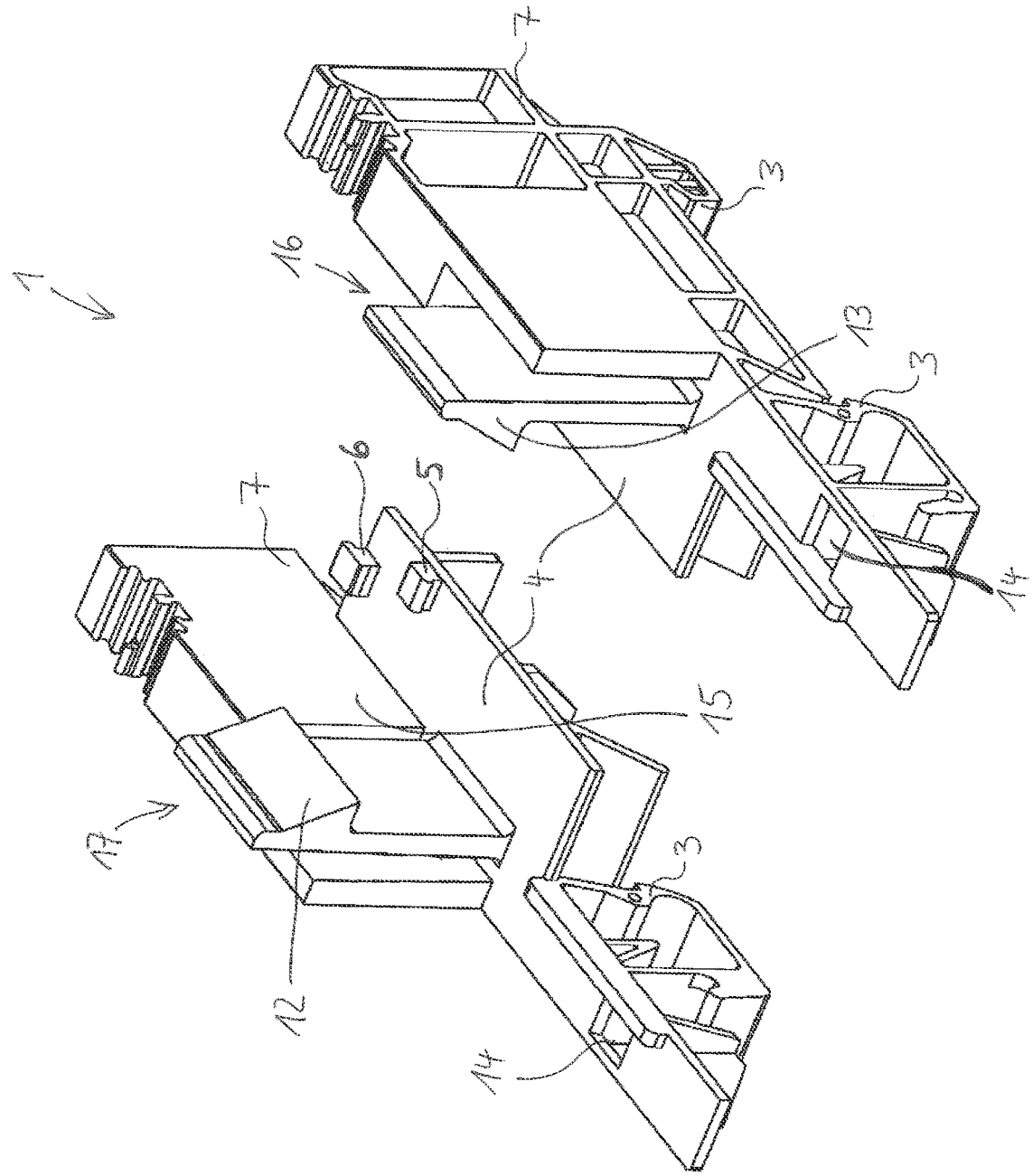
FIG. 1 is a two-part mounting rail adapter in a perspective representation.

FIG. 1 shows a mounting rail adapter 1, designed in two parts, that has a first adapter part 16 and a second adapter part 17. The second adapter part 17 can be designed to be completely or at least substantially mirror-symmetric to the first adapter part 16. The adapter parts 16, 17 can be produced as plastic injection molded components, for example.

As an alternative to the exemplary embodiment shown, the first and the second adapter part 16, 17 can also be a single piece or can be permanently connected to one another by a spacer.

The mounting rail adapter 1 has an assembly fastening region 4, in which can be arranged an electrical assembly that is to be fastened. On a side facing away from the assembly fastening region 4, the mounting rail adapter 1 has mounting rail fastening elements 3, which can be designed as latching elements, for example. By means of the mounting rail fastening elements 3, the mounting rail adapter 1 can be attached to a mounting rail.

The mounting rail adapter 1 has a body 7, which in this case is likewise designed in two parts. Each of the elements described below that are arranged on the body can be arranged on each adapter part 16, 17 on the body 7 in this design.

Arranged on the body 7 are assembly fastening elements 5, 6, at which the electrical assembly can be fastened to the mounting rail adapter 1. At least one of these assembly fastening elements 6 is designed as a pivot bearing element, by which means a pivot joint can be formed between the electrical assembly and the mounting rail adapter 1. Also arranged in the assembly fastening region 4 are snap-in arms 12, 13 projecting from the body, by which means the electrical assembly or an assembly coupled thereto can be secured on the mounting rail adapter 1, at least in a first pivot position. Additional such latching elements can be provided on the assembly fastening region 4. The body 7 also has a through opening 14 or an actuating slot. With the aid of an actuating tool, for example a screwdriver, inserted into the through opening 14 or actuating slot, at least one mounting rail fastening element 3 can be deflected so that the mounting rail adapter 1 or the adapter parts 16, 17 can be unlatched from the mounting rail.

Figure 2:
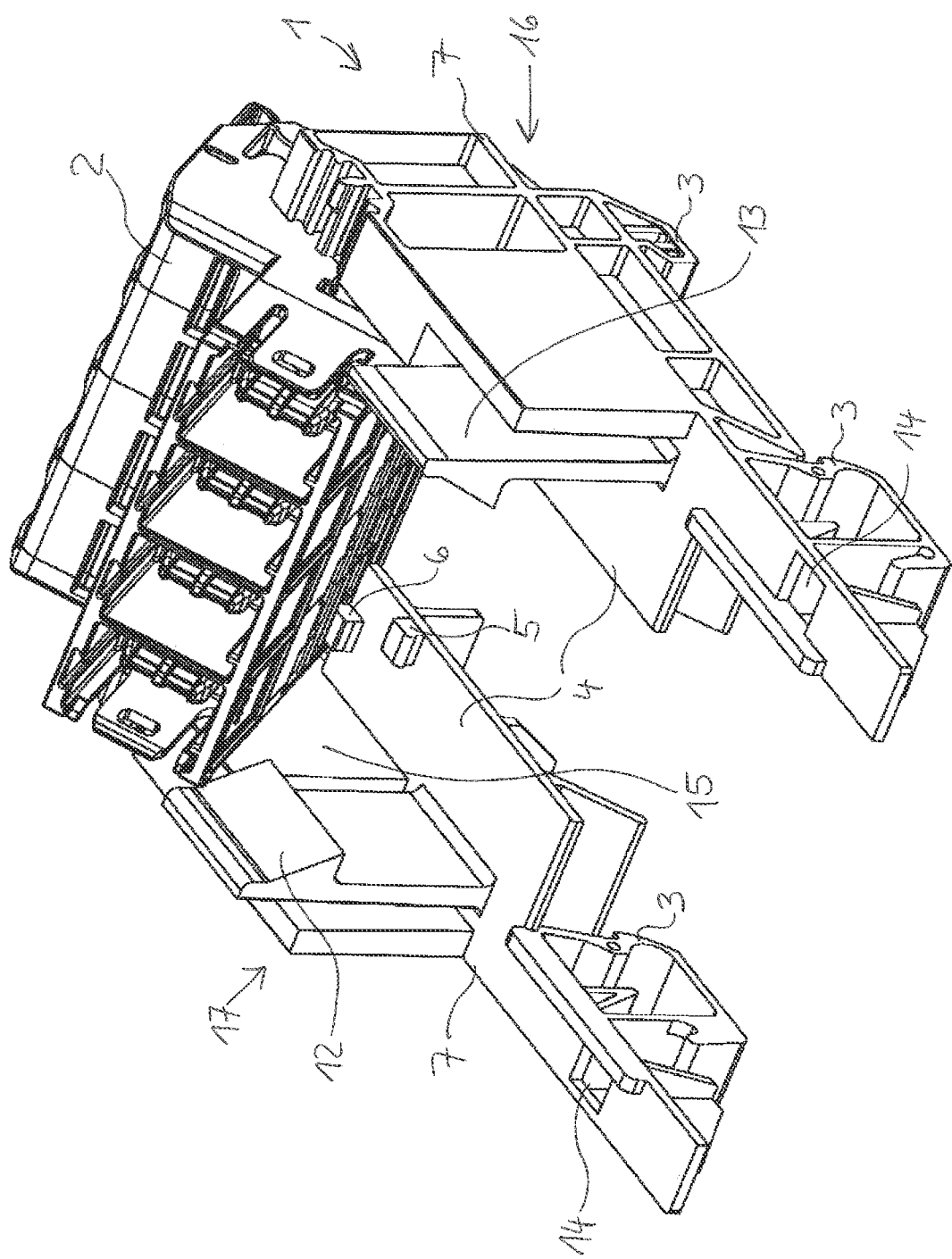
FIG. 2 is the mounting rail adapter from FIG. 1 with an electrical assembly fastened thereto.

FIG. 2 shows, arranged on the mounting rail adapter, an electrical assembly 2 that can be designed as a plug-and-socket connector, for example. Corresponding receiving elements of the electrical assembly 2 are placed on the assembly fastening elements 6, which form the pivot bearing element. In FIG. 2, the electrical assembly 2 is in a second pivot position, in which it assumes an angle to the mounting rail plane defined by the mounting rail fastening elements 3. In this state, the electrical assembly 2 is not yet secured by the snap-in arms 12, 13.

Figure 3:
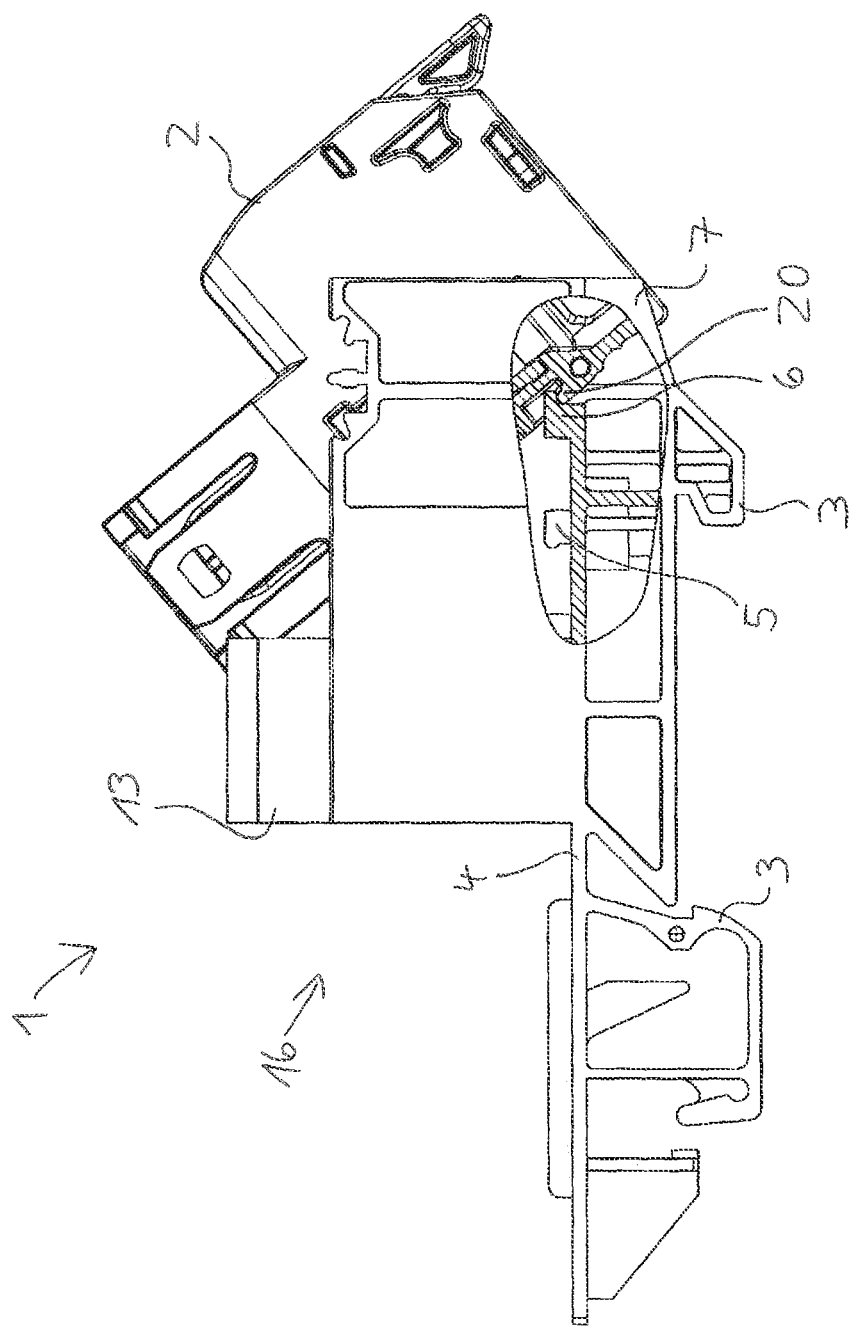
FIG. 3 is the arrangement from FIG. 2 in a side view with a sectional region.

FIG. 3 shows the arrangement from FIG. 2 in a side view, wherein a portion of the arrangement is shown as a section so that the pivoting connection of the electrical assembly 2 to the mounting rail adapter 1 is illustrated. Visible, in particular, is a recess that forms a receiving element 20, through which the electrical assembly 2 is initially placed on the assembly fastening element 6 in the oblique angle shown.

Figure 4:
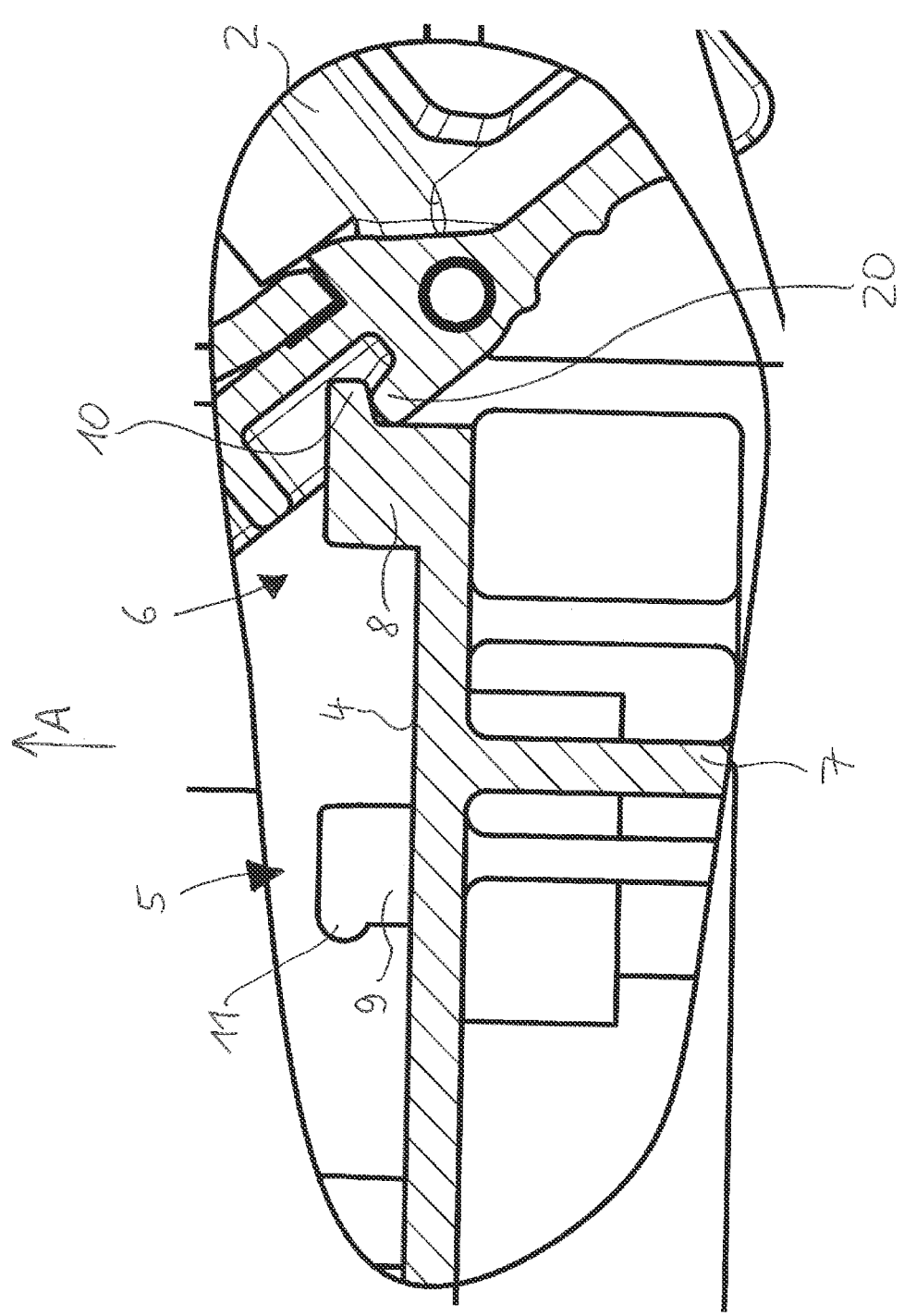
FIG. 4 is the sectional region marked in FIG. 3 in an enlarged representation.

FIG. 4 shows this arrangement in an enlarged representation. It can be seen that the assembly fastening element 6 is designed as a first retaining pin 8 projecting from the body 7 in the assembly fastening region 4. This first retaining pin 8 projects from the body 7 in a projection direction A. The first retaining pin 8 is furthermore designed to be angled in cross-sectional profile in a section plane extending in the projection direction A, which, in the exemplary embodiment shown, is realized by an angled section 10 that projects toward the receiving element 20. With this angled section 10, the first retaining pin 8 engages the receiving element 20, which is formed as a counterpart to the profile shape of the first retaining pin 8.

Also visible in FIG. 4 is the additional assembly fastening element 5, which is designed as a second retaining pin 9 projecting from the body 7 in the assembly fastening region 4. The second retaining pin 9 is arranged next to the first retaining pin 8, but is spaced a certain distance apart therefrom. In a first pivot position, in which the electrical assembly 2 and the additional assembly 21 are essentially parallel to the plane of the mounting rail, the second retaining pin 9 projects into an additional receiving element that is not shown.

The second retaining pin 9 likewise projects from the body 7 in a projection direction A. The second retaining pin 9 is designed to be angled in cross-sectional profile in a section plane extending in the projection direction A. This is realized by the means that the second retaining pin 9 has an angled section 11 projecting in the direction opposite to the angled section 10. The angled sections 10, 11 thus face in opposite directions. These angled sections 10, 11 have different lengths. The angled section 11 of the second retaining pin 9 is designed to be shorter than the angled section 10 of the first retaining pin 8. Alternatively, however, it is also possible in terms of a kinematic reversal for the angled sections 10, 11 to be of equal length. For reliable operation, the receiving elements 20 designed as recesses then have through openings that are matched in size and/or position for the entry of the retaining pins 8, 9 in the receiving elements 20.

Figure 5:
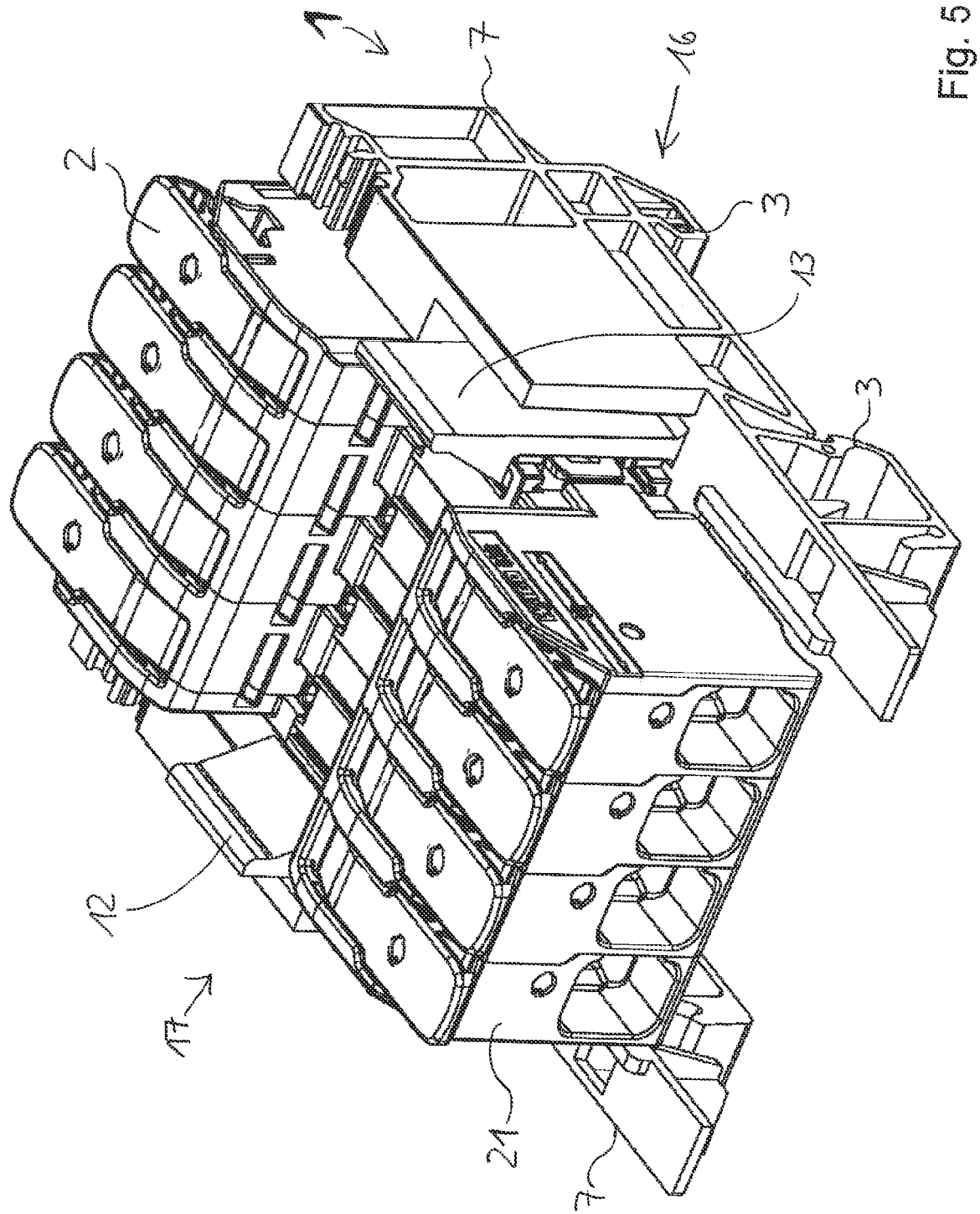
FIG. 5 is the mounting rail adapter with an electrical assembly fastened therein and an additional assembly coupled thereto.

FIG. 5 shows the mounting rail adapter 1 with the electrical assembly 2, to which an additional assembly 21 is also attached in this case, in a first pivot position in which the electrical assembly 2 and the additional assembly 21 are essentially parallel to the plane of the mounting rail. In this first pivot position, which can also be considered the operating position of the arrangement, the electrical assembly 2 is secured by means of the snap-in arms 12, 13. In the event the electrical assembly 2, if applicable with the additional assembly 21, is to be pivoted out of the plane of the mounting rail again, as for example into the second pivot position shown in FIG. 2, then the securing by the snap-in arms 12, 13 must first be released, for example by the means that the arms are deflected manually (e.g., with a finger) in directions that point away from one another. As a result, the securing of the electrical assembly 2 is unlocked again so that the assembly can be pivoted out of the position shown in FIG. 5. This pivoting motion is defined in this case by the assembly fastening elements 6 designed as a pivot bearing in conjunction with the receiving elements 20.

The mounting rail adapter 1 can additionally have one or more guide elements 15, by which means the electrical assembly 2 is guided at least laterally during the pivoting motions carried out at the assembly fastening element 5, 6.

In the second pivot position, the unsupported side of the plug-and-socket connection formed by the electrical assembly 2 and the additional assembly 21 can be mated or can be separated. In the first pivot position, forces acting on the electrical assembly 2, for example lever actuating forces, are absorbed in addition by the snap-in arms 12, 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A mounting rail adapter to fasten at least one electrical assembly to a mounting rail, the mounting rail adapter comprising:
mounting rail fastening elements that are configured to fasten the mounting rail adapter to the mounting rail;
an assembly fastening region that is configured to fasten the at least one electrical assembly;
at least one assembly fastening element arranged in the assembly fastening region to which the at least one electrical assembly is adapted to be fastened to the mounting rail adapter,
wherein the at least one assembly fastening element forms a pivot bearing element to form a pivot joint between the at least one electrical assembly and the mounting rail adapter,
wherein the mounting rail adapter has a body, the body having an upper surface,
wherein the at least one assembly fastening element is formed as a first retaining pin projecting from the body in the assembly fastening region,
wherein the first retaining pin projects perpendicularly from the upper surface of the body in a projection direction, wherein an upper end of the first retaining pin is angled so as to provide an angled section, the angled section projecting in a direction that is perpendicular to the projection direction,
wherein an additional assembly fastening element is provided and is formed as a second retaining pin that projects from the body in the assembly fastening region and is arranged next to the first retaining pin,
wherein the second retaining pin projects perpendicularly from the upper surface of the body in the projection direction, wherein an upper end of the second retaining pin is angled so as to provide an angled section, the angled section projecting in a direction that is perpendicular to the projection direction,
wherein the angled section of each of the first and second retaining pins project in directions that point away from one another, and
wherein the first retaining pin and the second retaining pin are each monolithically connected to the upper surface of the body so as to project directly from the upper surface of the body.

2. A mounting rail adapter to fasten at least one electrical assembly to a mounting rail, the mounting rail adapter comprising:
mounting rail fastening elements that are configured to fasten the mounting rail adapter to the mounting rail;
an assembly fastening region that is configured to fasten the at least one electrical assembly;
at least one assembly fastening element arranged in the assembly fastening region to which the at least one electrical assembly is adapted to be fastened to the mounting rail adapter,
wherein the at least one assembly fastening element forms a pivot bearing element to form a pivot joint between the at least one electrical assembly and the mounting rail adapter,
wherein the mounting rail adapter has a body, the body having at least one snap-in arm that projects from the body, the at least one snap-in arm projecting from the body in the assembly fastening region or next to the assembly fastening region, and wherein the at least one snap-in arm latches onto the at least one electrical assembly or an electrical assembly coupled thereto to secure the at least one electrical assembly or the electrical assembly coupled thereto on the mounting rail adapter in at least a first pivot position,
wherein the at least one assembly fastening element is formed as a first retaining pin projecting from the body in the assembly fastening region,
wherein an additional assembly fastening element is provided and is formed as a second retaining pin that projects from the body in the assembly fastening region and is arranged next to the first retaining pin, and
wherein the at least one snap-in arm is monolithically connected to the body and the second retaining pin is monolithically connected to the body.

3. The mounting rail adapter according to claim 2, wherein the first retaining pin projects from the body in a projection direction, wherein the first retaining pin is angled in cross-sectional profile in a section plane extending in the projection direction, such that the first retaining pin is provided with an angled section.

4. The mounting rail adapter according to claim 2, wherein the second retaining pin projects from the body in a projection direction, wherein the second retaining pin is angled in cross-sectional profile in a section plane extending in the projection direction, such that the second retaining pin is provided with an angled section.

5. The mounting rail adapter according to claim 4, wherein the angled section of the second retaining pin is shorter than the angled section of the first retaining pin.

6. The mounting rail adapter according to claim 4, wherein the angled section of each of the first and second retaining pins are angled in directions that point away from one another.

7. The mounting rail adapter according to claim 6, wherein the body has a first end, a second end and a central portion provided between the first end and the second end, and wherein each of the first and second retaining pins are provided at the first end of the body and the at least one snap-in arm is provided at the central portion of the body.

8. The mounting rail adapter according to claim 2, wherein the mounting rail adapter has at least one additional latching element, at which the at least one electrical assembly or the electrical assembly coupled thereto is secured on the mounting rail adapter in at least one second pivot position that differs from the first pivot position.

9. The mounting rail adapter according to claim 2, wherein the mounting rail adapter has at least one locking element, via which an additional electrical assembly connected to the at least one electrical assembly that is fastened to the mounting rail adapter is locked in at least one pivot position on the mounting rail adapter in at least one spatial direction of the assemblies.

10. The mounting rail adapter according to claim 2, wherein the mounting rail adapter has at least one guide element in the assembly fastening region via which the at least one electrical assembly is guided during a pivoting motion carried out on the at least one assembly fastening element, the at least one guide element being monolithically connected to the body.

11. The mounting rail adapter according to claim 2, wherein the mounting rail adapter is designed in at least two parts with a first adapter part and a second adapter part, and the at least one electrical assembly is fastened to the first adapter part on one side and to the second adapter part on another side.

12. A set comprising the mounting rail adapter according to claim 2 and the at least one electrical assembly that is fastened to the mounting rail adapter.

* * * * *